(12) United States Patent
Sakai et al.

(10) Patent No.: US 12,411,900 B2
(45) Date of Patent: *Sep. 9, 2025

(54) INFORMATION PROCESSING DEVICE

(71) Applicant: NTT DOCOMO, INC., Tokyo (JP)

(72) Inventors: Akinari Sakai, Chiyoda-ku (JP);
Tetsuya Yamaguchi, Chiyoda-ku (JP);
Takuya Izumisawa, Chiyoda-ku (JP);
Yusuke Nakamura, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/686,021

(22) PCT Filed: Aug. 25, 2022

(86) PCT No.: PCT/JP2022/032075
§ 371 (c)(1),
(2) Date: Feb. 23, 2024

(87) PCT Pub. No.: WO2023/074102
PCT Pub. Date: May 4, 2023

(65) Prior Publication Data
US 2024/0427826 A1    Dec. 26, 2024

(30) Foreign Application Priority Data

Oct. 26, 2021 (JP) ................................ 2021-174407

(51) Int. Cl.
*G06F 16/00* (2019.01)
*G06F 16/23* (2019.01)
(Continued)

(52) U.S. Cl.
CPC ...... *G06F 16/9536* (2019.01); *G06F 16/2358* (2019.01); *G06F 16/9535* (2019.01)

(58) Field of Classification Search
CPC ............ G06F 16/2358; G06F 16/9535; G06F 16/9536; G06F 16/27; G06F 21/71;
(Continued)

(56) References Cited

U.S. PATENT DOCUMENTS

2013/0290005 A1* 10/2013 Vesto ..................... G16H 50/50
705/2
2017/0098268 A1* 4/2017 Karvela ................. G06F 1/163
(Continued)

FOREIGN PATENT DOCUMENTS

JP        2020-140596 A    9/2020

OTHER PUBLICATIONS

International Search Report mailed on Nov. 8, 2022 in PCT/JP2022/032075 filed on Aug. 25, 2022, 2 pages.
(Continued)

*Primary Examiner* — Shyue Jiunn Hwa
(74) *Attorney, Agent, or Firm* — Oblon, McClelland, Maier & Neustadt, L.L.P.

(57) ABSTRACT

A nudge recommendation system includes a verification group storage unit configured to store a verification group management table, a user information storage unit configured to store a user management table, a user nudge storage unit configured to store a user nudge definition table, a nudge changing unit configured to perform changing recommendation information to information different from that of a target nudge and changing the recommendation information to the target nudge after the changing has been performed, and an update unit configured to acquire a result of recommendation of the target nudge to each user and to update the user management table such that the result of recommendation of the target nudge is newly defined in the user management table.

3 Claims, 14 Drawing Sheets

(51) Int. Cl.
*G06F 16/9535* (2019.01)
*G06F 16/9536* (2019.01)

(58) Field of Classification Search
CPC ........ G06F 21/73; G06F 3/167; G06F 16/125;
G06F 21/33; G06F 21/51; G06F 21/72;
G06F 21/10; G06F 16/174; G06F 16/20;
G06F 16/273; G06F 16/278; G06F 21/74;
G06F 21/52; G06Q 10/06; G07F 17/32;
G07F 17/3239
See application file for complete search history.

(56) References Cited

U.S. PATENT DOCUMENTS

2021/0221247 A1* 7/2021 Daniel .................... B60L 55/00
2024/0366910 A1* 11/2024 Sakai ................... G06Q 30/015

OTHER PUBLICATIONS

International Preliminary Report on Patentability and Written Opinion issued May 10, 2024, in PCT/JP2022/032075 (with English Translation), 5 pages.

* cited by examiner

| COLUMN NAME | EXAMPLE 1 | EXAMPLE 2 | EXAMPLE 3 | EXAMPLE 4 |
|---|---|---|---|---|
| USER ID | 001 | 002 | 003 | 004 |
| NUDGE ID1 | 1 | 1 | 0 | 2 |
| NUDGE ID2 | 1 | 2 | 0 | 1 |

*Fig.7*

| COLUMN NAME | EXAMPLE 1 | EXAMPLE 2 |
|---|---|---|
| VERIFICATION GROUP ID | 1 | 1 |
| NUDGE GROUP ID | A | B |
| FIRST-SECTION NUDGE ID1 | 1 | 2 |
| FIRST-SECTION NUDGE ID2 | 1 | 1 |
| SECOND-SECTION NUDGE ID1 | 10 | 10 |
| SECOND-SECTION NUDGE ID2 | 10 | 10 |
| THIRD-SECTION NUDGE ID1 | 1 | 2 |
| THIRD-SECTION NUDGE ID2 | 1 | 1 |
| ... | ... | ... |
| N-TH-SECTION NUDGE ID2 | | |

Fig.8

| COLUMN NAME | EXAMPLE |
|---|---|
| USER ID | 001 |
| NUDGE GROUP ID | A |
| FIRST-SECTION NUDGE ID1 | 1 |
| FIRST-SECTION NUDGE ID2 | 1 |
| SECOND-SECTION NUDGE ID1 | 10 |
| SECOND-SECTION NUDGE ID2 | 10 |
| ... | ... |
| N-TH-SECTION NUDGE ID2 | |
| DEMONSTRATION START DATE | 2021/7/4 |
| FIRST-SECTION CUMULATIVE PUSH NOTIFICATION FREQUENCY | 12 |
| FIRST-SECTION CUMULATIVE NUDGE INTERVENTION FREQUENCY | 5 |
| FIRST-SECTION CUMULATIVE BEHAVIORAL MODIFICATION FREQUENCY | 3 |
| ... | ... |

| CURRENT VERIFICATION GROUP ID | TARGET NUMBER OF SAMPLES OF EACH NUDGE GROUP | AUTOMATIC GROUP IUD SWITCHING MODE |
|---|---|---|
| 1 | 300 | ON |

| COLUMN NAME | EXAMPLE |
|---|---|
| USER ID | 001 |
| NUDGE GROUP ID | A |
| FIRST-SECTION NUDGE ID1 | 1 |
| FIRST-SECTION NUDGE ID2 | 1 |
| SECOND-SECTION NUDGE ID1 | 10 |
| SECOND-SECTION NUDGE ID2 | 10 |
| THIRD-SECTION NUDGE ID1 | 1 |
| THIRD-SECTION NUDGE ID2 | 1 |
| ... | ... |
| N-TH-SECTION NUDGE ID2 | |
| DEMONSTRATION START DATE | 2021/7/4 |
| FIRST-SECTION CUMULATIVE PUSH NOTIFICATION FREQUENCY | 12 |
| FIRST-SECTION CUMULATIVE NUDGE INTERVENTION FREQUENCY | 5 |
| FIRST-SECTION CUMULATIVE BEHAVIORAL MODIFICATION FREQUENCY | 3 |
| ... | ... |

12a (b)

| COLUMN NAME | EXAMPLE |
|---|---|
| USER ID | 003 |
| NUDGE GROUP ID1 | 10 |
| NUDGE GROUP ID2 | 10 |

200a

INFORMATION PROCESSING DEVICE

TECHNICAL FIELD

An aspect of the present invention relates to an information processing device.

BACKGROUND ART

In Patent Literature 1, a system for promoting behavioral modification of a user by using nudges which are mechanisms based on cognitive biases for prompting a user to voluntarily adopt a behavior which is desirable in individuals or societies is described.

CITATION LIST

Patent Literature

[Patent Literature 1] Japanese Unexamined Patent Publication No. 2020-140596

SUMMARY OF INVENTION

Technical Problem

In behavioral economics, nudges are considered to be abraded. Here, abrasion of a nudge means that a behavioral modification effect based on the nudge decreases because repeated intervention (recommendation for a user) is performed. It is conceivable that an effect will be restored for a nudge of which an effect has temporarily been abraded, after elapse of a certain time period. In the related art, means for appropriately verifying the effects of abrasion and recovery of a nudge have not been proposed.

An aspect of the present invention was made in consideration of the aforementioned circumstances and an objective thereof is to appropriately verify effects of abrasion and recovery of a nudge.

Solution to Problem

An information processing device according to an aspect of the present invention is an information processing device that performs verification of an effect of abrasion due to a plurality of times of recommendation of a nudge which is a mechanism for prompting a user to voluntarily adopt a desirable behavior and verification of an effect of recovery due to the elapse of a period after the nudge has been abraded, the information processing device including: a verification group storage unit configured to store a verification group management table in which a plurality of verification groups each including a plurality of nudge groups with different target nudges is defined; a user information storage unit configured to store a user management table in which information for identifying the verification group and the nudge group to which a user belongs is defined for each of a plurality of users; a user nudge storage unit configured to store a user nudge definition table in which recommendation information which is information to be recommended to each of the plurality of users is defined and the target nudge is defined as a recommendation-start value of the recommendation information; a nudge changing unit configured to perform changing the recommendation information in the user nudge definition table to information different from that of the target nudge at a timing at which a predetermined period in which a plurality of times of recommendation is possible elapses after recommendation has started and changing the recommendation information in the user nudge definition table to the target nudge at a timing at which a predetermined period in which a plurality of times of recommendation is possible elapses after the changing has been performed; and an update unit configured to acquire a result of recommendation of the target nudge to each user and to update the user management table such that the result of recommendation of the target nudge is newly defined in the user management table.

The information processing device according to an aspect of the present invention is an information processing device that performs verification of effects of abrasion and recovery of a nudge. In the information processing device, a plurality of verification groups each including a plurality of nudge groups is defined, and a verification group and a nudge group to which each of a plurality of users belongs are defined. For each of the plurality of users, a target nudge (different target nudges for the nudge groups to which users belong) is defined as a value of recommendation information at the time of starting of recommendation, the recommendation information is changed to information different from the target nudge when a predetermined period in which a plurality of times of recommendation is possible elapses, and the recommendation information is changed again to the target nudge when a predetermined period in which a plurality of times of recommendation is possible additionally elapses. Here, it is thought that a target nudge is gradually abraded when a plurality of times of recommendation is performed in a state in which the target nudge is defined as the value at the time of starting of recommendation. By acquiring a recommendation result of the target nudge which is gradually abraded and defining the recommendation result in the user management table, it is possible to appropriately acquire information suitable for verification of abrasion of the target nudge. It is thought that an effect of a target nudge which has been once abraded is recovered when other information is recommended a plurality of times in a predetermined period after the target nudge has been abraded. By recommending the target nudge again thereafter, acquiring the recommendation result, and defining the recommendation result in the user management table, it is possible to appropriately acquire information suitable for verification of an effect of recovery of the target nudge. With this configuration, it is possible to appropriately acquire information suitable for verification of effects of abrasion and recovery of nudges and to contribute to appropriate verification of effects of abrasion and recovery of nudges.

Advantageous Effects of Invention

According to the aspect of the present invention, it is possible to appropriately verify effects of abrasion and recovery of a nudge.

BRIEF DESCRIPTION OF DRAWINGS

FIG. 6 is a diagram illustrating an example of a user nudge definition table.

FIG. 7 is a diagram illustrating an example of a verification group management table.

FIG. 8 is a diagram illustrating an example of a user management table.

FIG. 9 is a diagram illustrating an example of a user registration management table.

FIG. 11 is a diagram illustrating change (switching) of a target nudge.

DESCRIPTION OF EMBODIMENTS

Hereinafter, embodiments of the present invention will be described in detail with reference to the accompanying drawings. In description with reference to the drawings, the same or equivalent elements will be referred to by the same reference signs and repeated description thereof will be omitted.

Figure 1:
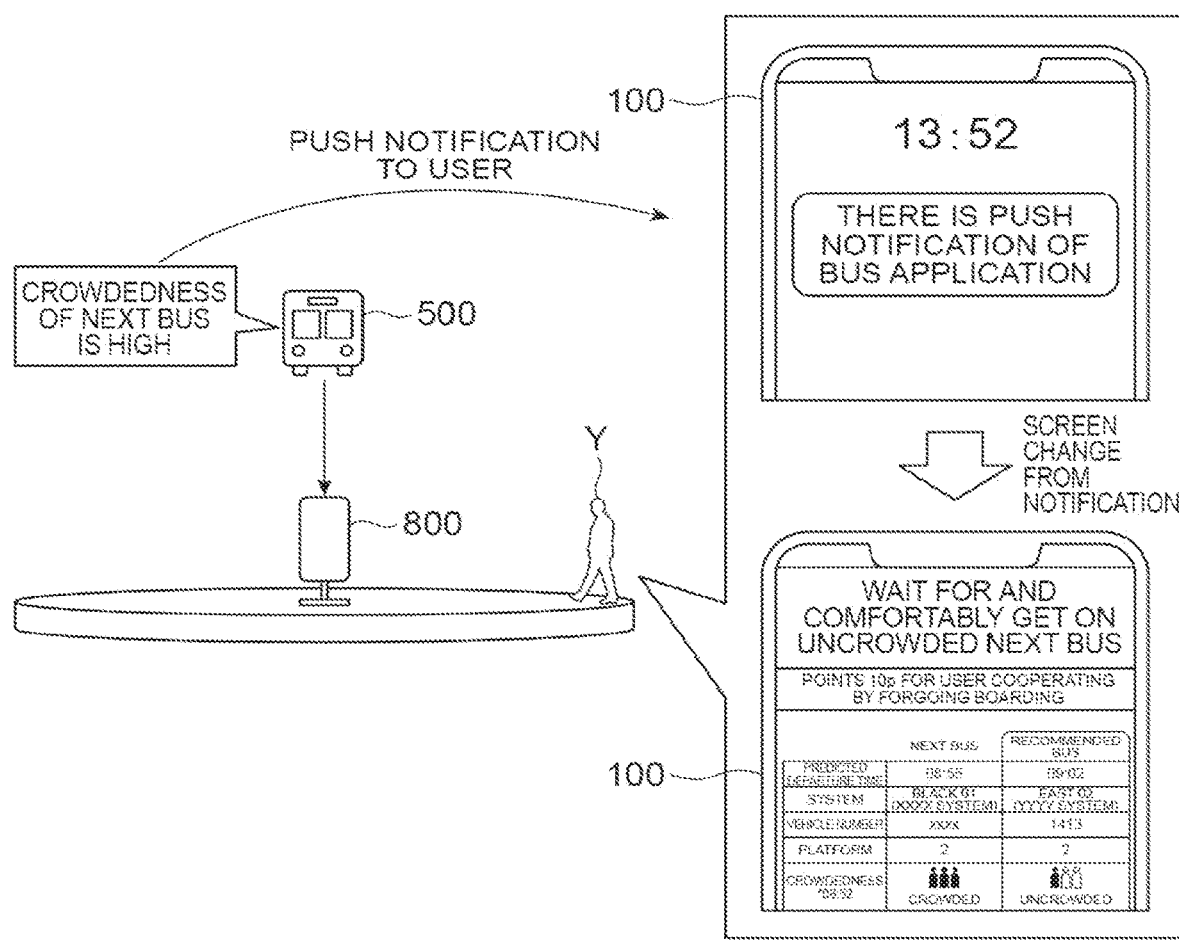
FIG. 1 is a diagram illustrating a process flow of promoting behavioral modification of a user using a nudge.
Figure 2:
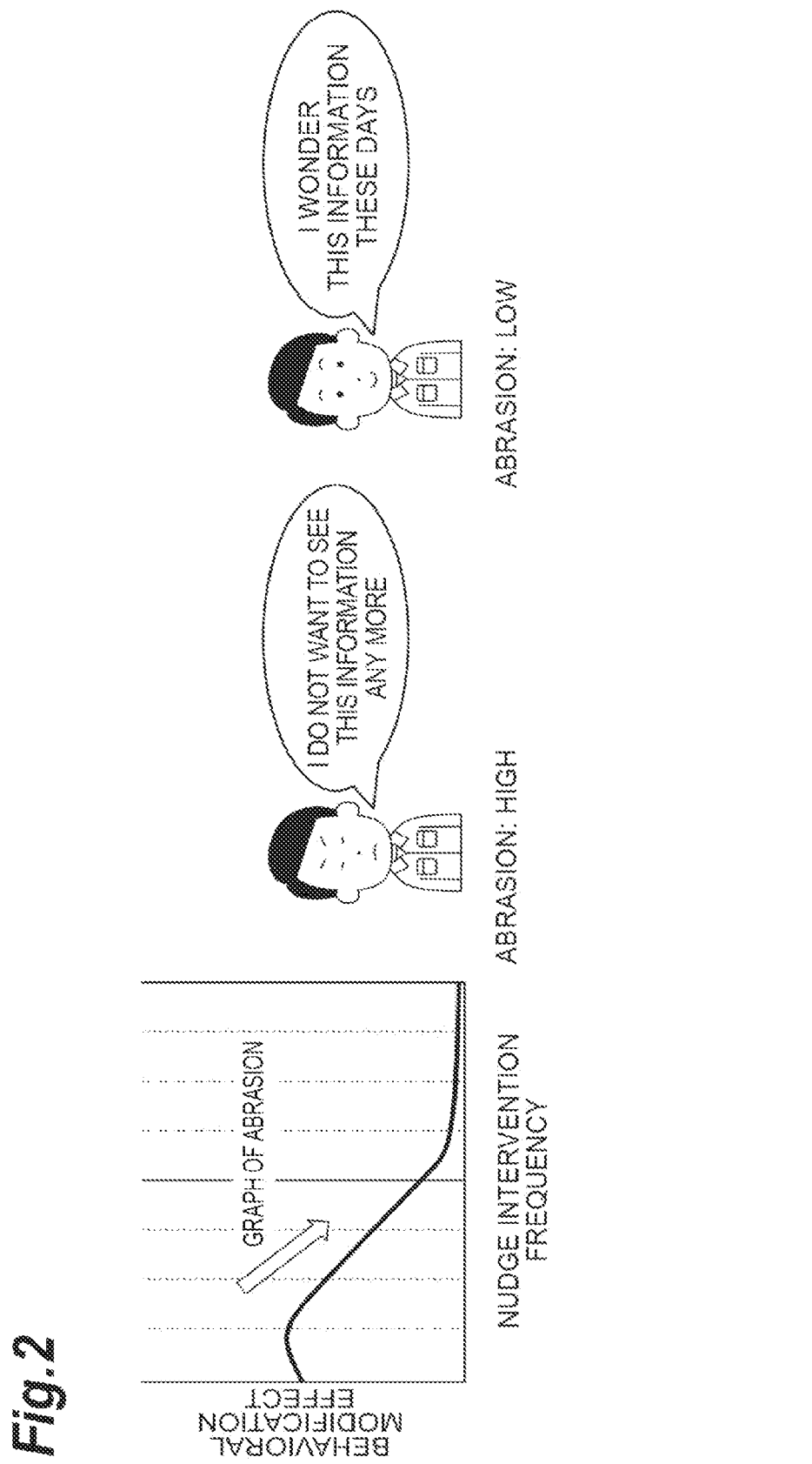
FIG. 2 is a diagram illustrating abrasion of a nudge.

First, a nudge described in the embodiment and promotion of behavioral modification of a user using the nudge will be described with reference to FIGS. 1 and 2. FIG. 1 is a diagram illustrating a process flow of promoting behavioral modification of a user using a nudge. FIG. 2 is a diagram illustrating abrasion of a nudge.

A nudge is a structure or mechanism based on cognitive biases for prompting a user to voluntarily adopt a behavior which is desirable in individuals or societies. In this embodiment, it is assumed that a nudge is display of a message which is displayed on a communication terminal such as a smartphone. FIG. 1 illustrates a scene in which a user Y moves to a bus stop 800 to get on a bus 500. As illustrated in FIG. 1, it is now assumed that a crowdedness level of a bus 500 (a next bus) on which the user Y is scheduled to get is high. In this case, for example, a predetermined application (for example, a bus application for assisting with getting on a bus) causes a communication terminal 100 such as a smartphone of the user Y to output a push notification. The push notification is a notification associated with a nudge for promoting behavioral modification of the user and specifically a notification associated with a nudge for prompting the user to get on a bus (a recommended bus) other than the crowded next bus 500.

As illustrated in FIG. 1, when the user Y changes the push notification output by the communication terminal 100 to a nudge screen, information indicating that a next bus 500 is crowded and information indicating a scheduled departure time or a degree of crowdedness of a recommended bus are displayed along with a message such as "wait for and comfortably get on an uncrowded next bus" and "user cooperating by forging boarding will be presented with points 10 p." A state in which there has been change to the nudge screen in response to a push notification in this way is a "nudge-intervened" state in a user. The user Y checks the nudge screen and selects whether to change an originally scheduled behavior to adopt the behavior of "getting on the recommended bus."

In order to prompt the user Y to effectively perform behavioral modification ("to get on the recommended bus" in the aforementioned example), it is important to intervene with a most effectual nudge for the user Y at an appropriate timing. The appropriate timing at which nudge intervention is performed may be determined, for example, based on information acquired via the application (a "bus application" in the aforementioned example) of the communication terminal 100 or position information of the user Y. In this embodiment, detailed description of the timing at which nudge intervention is performed will be omitted. As an effectual nudge, a nudge with a highest behavioral modification effect in the current scene is considered to be selected, for example, based on information acquired via the application (the "bus application" in the aforementioned example) of the communication terminal 100. For example, in the example in which the scheduled bus 500 is crowded, when there are a nudge for promoting change of a transportation means, a nudge for prompting a user to forgo boarding the bus, and a nudge for prompting a user to make a detour, selecting the nudge for prompting a user to send the bus off in which a probability of selection by a user is generally considered to be highest is conceivable.

Here, it is assumed that a behavioral modification effect of a nudge is not fixed but changes in behavioral economics. Specifically, as illustrated in FIG. 2, it is considered that a behavioral modification effect of a nudge having intervened in a user daily (continuously in a long term) decreases gradually. In the following description, this decrease of a behavioral modification effect based on intervention in a user may be referred to as "abrasion of a nudge." In a state in which abrasion of a nudge has progressed, a user does not want to see the nudge (information) and it is difficult to promote behavioral modification of the user. On the other hand, in a state in which abrasion of a nudge has not progressed, a user is likely to have an interest in the nudge (information) and it is possible to effectively promote behavioral modification of the user. By identifying abrasion of nudges, it is possible to select a nudge with a higher behavioral modification effect.

For example, when even a nudge which has been once abraded due to repeated intervention for a user does not intervenes for the user for a predetermined period, it is conceivable that the behavioral modification effect of the nudge may gradually recover. In the following description, recovery of a behavioral modification effect of a nudge may be referred to as "recovery of a nudge." By identifying recovery of nudges, it is possible to select a nudge with a better behavioral modification effect.

Figure 3:
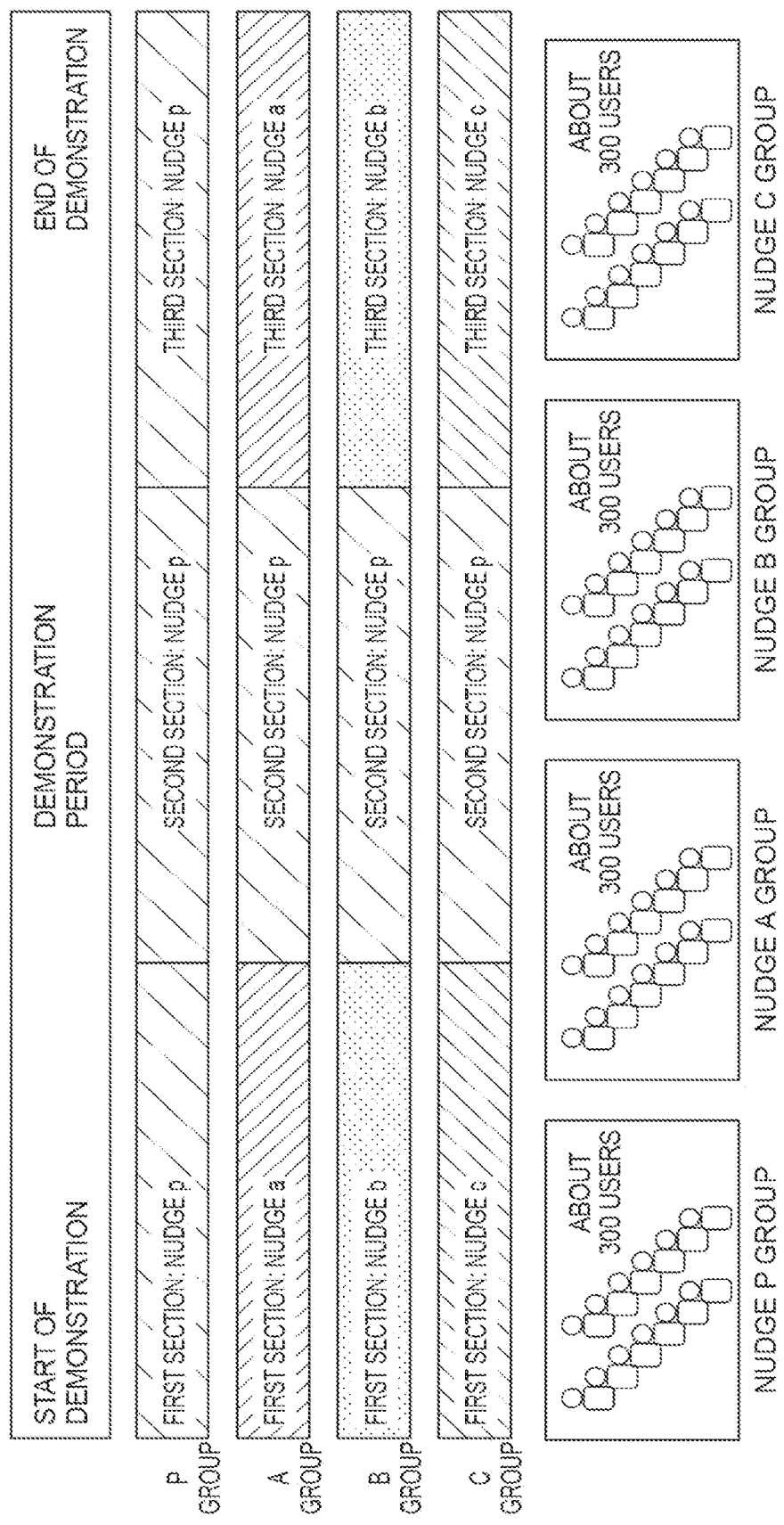
FIG. 3 is a diagram illustrating a demonstration test associated with verification of effects of abrasion and recovery of nudges.
Figure 4:
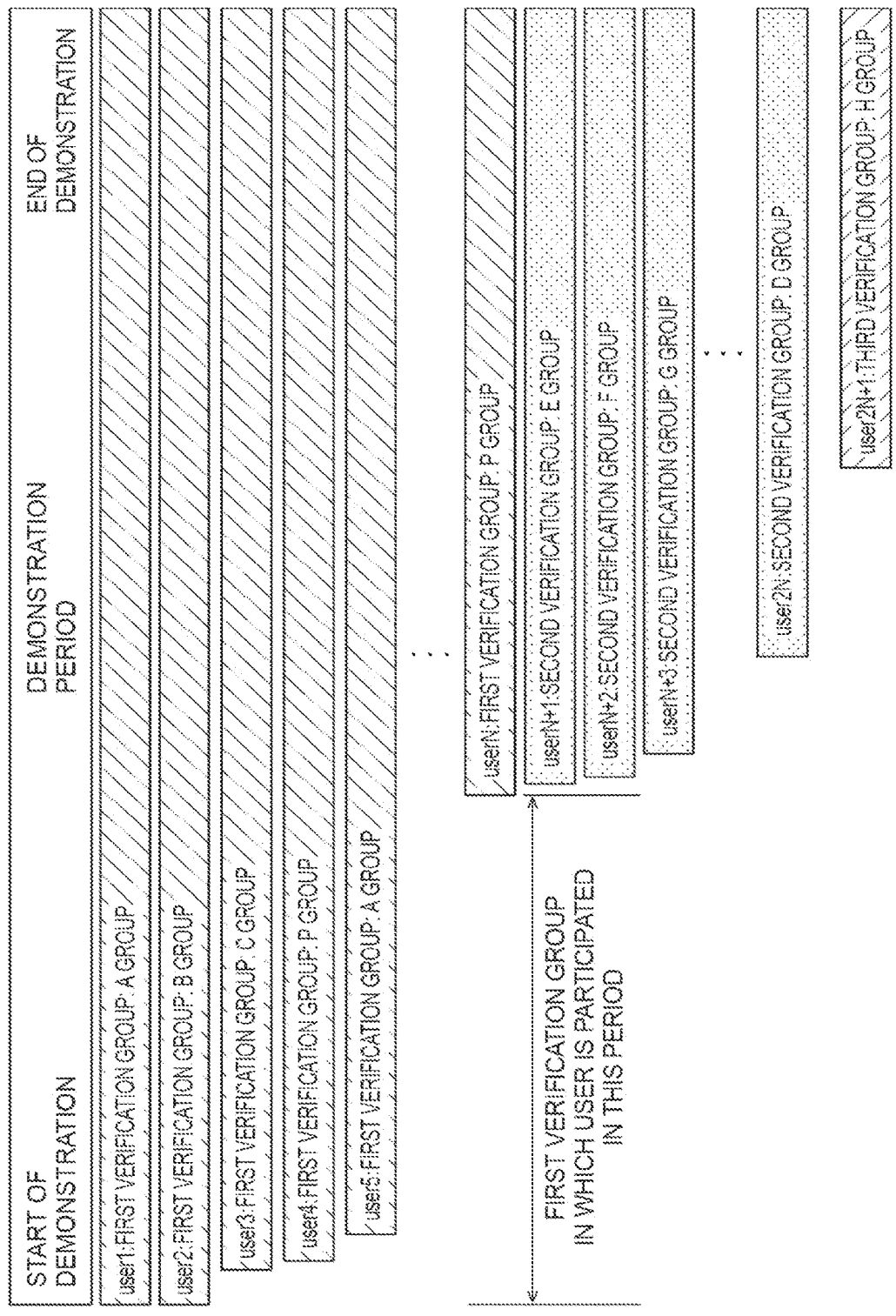
FIG. 4 is a diagram illustrating verification groups in the demonstration test illustrated in FIG. 3.

As described above, in order to appropriately select a nudge to be recommended, it is important to consider abrasion and recovery of nudges. Therefore, it is conceivable that a demonstration test be performed and effects of abrasion and recovery of nudges be verified in advance. A demonstration test for verifying effects of abrasion and recovery of a plurality of nudges will be described below with reference to FIGS. 3 and 4. FIG. 3 is a diagram illustrating a demonstration test associated with verification of effects of abrasion and recovery of nudges. FIG. 4 is a diagram illustrating verification groups in the demonstration test illustrated in FIG. 3.

The demonstration test is performed in units of a plurality of nudge groups with different target nudges of which each is a nudge for which effects of abrasion and recovery are verified. In FIG. 3, a nudge P group in which a target nudge is a nudge p, a nudge A group in which a target nudge is a nudge a, a nudge B group in which a target nudge is a nudge b, and a nudge C group in which a target nudge is a nudge c are illustrated. A plurality of (about 300 in the example illustrated in FIG. 3) users who are recommendation destinations of a target nudge belongs to each nudge group.

As illustrated in FIG. 3, in the demonstration test, a demonstration period is divided into three sections (sub periods) including a first section, a second section subsequent to the first section, and a third section subsequent to the second section. In the first section, a target nudge is recommended to the users of each nudge group a plurality of time. For example, the nudge a which is a target nudge is recommended to each of about 300 users of the nudge A group a plurality of times. The first section in which the same nudge is repeatedly recommended in a predetermined period is a section associated with verification of abrasion of a target nudge.

In the second section, information other than the target nudge is recommended to the users of each nudge group. In the example illustrated in FIG. 3, a common nudge p is exemplified as the information other than the target nudge. Here, the nudge p is described to be a nudge for the purpose of convenience of explanation, but may be a simple message without a nudge component. The second section may be any section in which the target nudge is not recommended, and may be, for example, a section in which no nudge is recommended. In the nudge P group out of the nudge groups illustrated in FIG. 3, unlike the other nudge groups, switching of a nudge is not performed by sections and the nudge p is always recommended. The nudge p of the nudge P group is not a nudge for verification of effects of abrasion and recovery thereof, but is used, for example, as reference information at the time of evaluation (verification) of the nudges a, b, and c which are the other target nudges.

In the third section, the target nudge is recommended again to the users of each nudge group a plurality of times. For example, the nudge a which is a target nudge is recommended to about 300 users of the nudge A group a plurality of times. The second section and the third section are sections associated with verification of recovery of the target nudge abraded in the first section (recovery of the target nudge due to recommendation of information other than the target nudge in the second section). In the demonstration test, since the demonstration period is divided and a nudge is determined for each section in this way, it is necessary to switch a nudge to be recommended to users at an appropriate timing (details of which will be described later).

In the demonstration test, in view of appropriate verification of effects of abrasion and recovery of each target nudge, the numbers of users (training data) in the nudge groups are intended not to be biased. In the example illustrated in FIG. 4, in units of a verification group including a plurality of nudge groups, new users (user 1 to user 4, . . . ) are distributed to the nudge groups (the nudge A group, the nudge B group, the nudge C group, and the nudge P group) included in one verification group (for example, a first verification group). When the number of users belonging to each nudge group included in the first verification group reaches a target value, a verification group in which a new user is registered is changed to a next verification group (for example, a second verification group), and new users are distributed to the nudge groups (a nudge D group, a nudge E group, a nudge F group, and a nudge G group) included in the second verification group. In this way, in the demonstration test, new users need to be appropriately distributed to the nudge groups (details of which will be described later) such that the numbers of users in the nudge groups are not biased at the time of registration of new users. In the following description, a process of distributing new users to nudge groups and a section switching process which are performed to appropriately perform a demonstration test will be mainly described.

Figure 5:
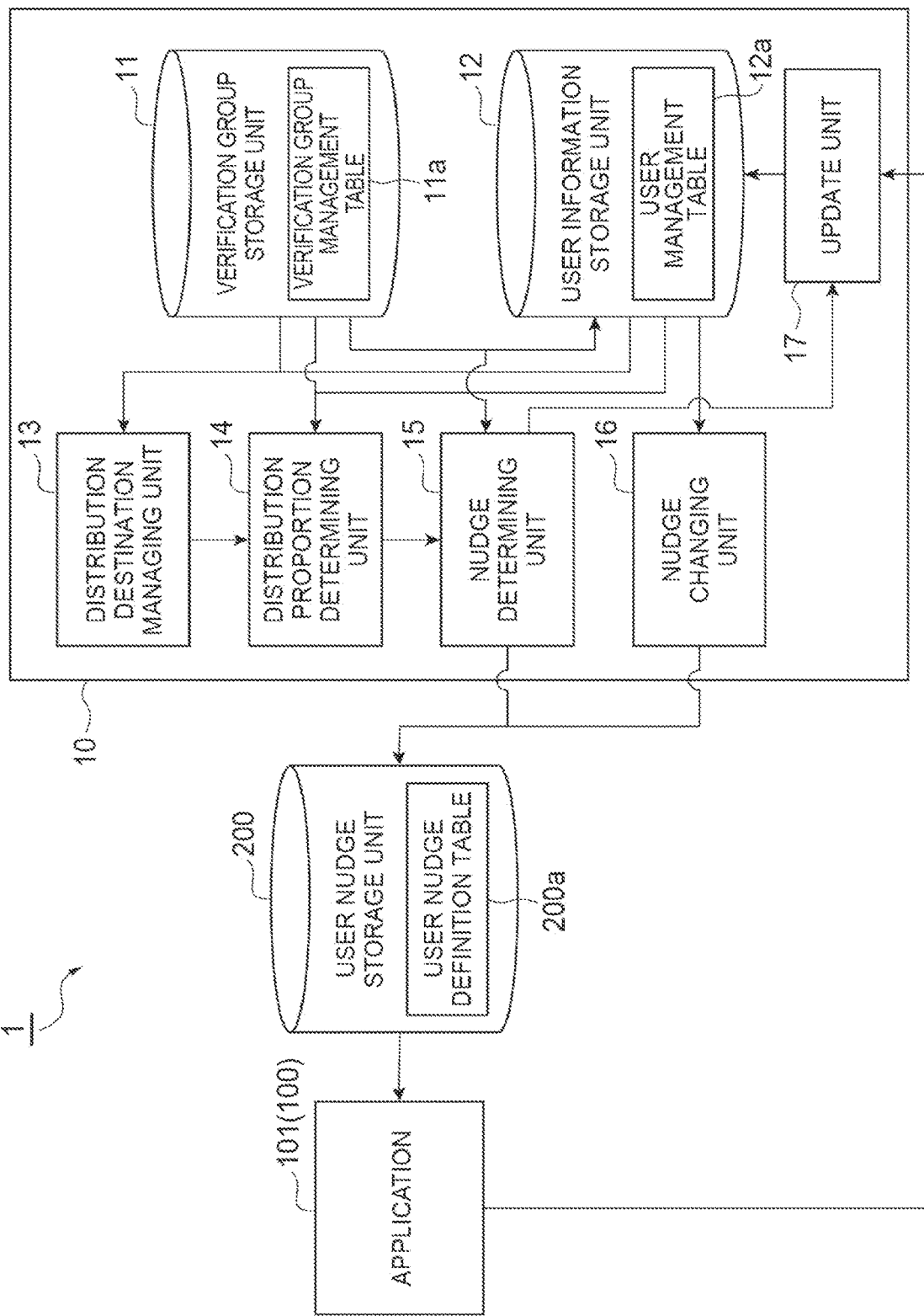
FIG. 5 is a functional block diagram of a nudge management device according to an embodiment.

FIG. 5 is a functional block diagram of a nudge management device 10 included in a nudge recommendation system 1 (an information processing device) according to the embodiment. The nudge recommendation system 1 is a system for recommending a nudge to a user and particularly a system for performing the demonstration test herein. As illustrated in FIG. 5, the nudge recommendation system 1 includes an application 101 of a communication terminal 100, a user nudge storage unit 200, and a nudge management device 10. The nudge recommendation system 1 actually includes applications 101 of a plurality of communication terminals 100 of different users, but only the application 101 of one communication terminal 100 will be described herein for the purpose of convenience of explanation.

The communication terminal 100 is a terminal that can perform wireless communication, and examples thereof include a smartphone, a tablet terminal, and a PC terminal. The application 101 is an application that can be activated in the communication terminal 100, and an example thereof is a bus application for assisting with getting on a bus.

The user nudge storage unit 200 is a database that stores a user nudge definition table 200a in which recommendation information which is information to be recommended to each of a plurality of users is defined. FIG. 6 is a diagram illustrating an example of the user nudge definition table 200a. As illustrated in FIG. 6, in the user nudge definition table 200a, a user ID, a nudge ID1, and a nudge ID2 are defined in correlation with each other. The user ID is information for uniquely identifying a user. The nudge ID1 is information for uniquely identifying a psychological bias associated with a nudge to be recommended. The psychological bias is, for example, a sympathy bias or a bias for loss aversion. The nudge ID2 is information for uniquely identifying a type of a nudge to be recommended. The type of a nudge is information indicating what type nudges of the psychological bias indicated by the nudge ID1 are. For example, when the nudge ID1=1 is a bias for loss aversion, a plurality of nudges (nudges with the nudge ID1=1) with the bias for loss aversion can be present, but a certain type of nudge is uniquely identified out of the plurality of nudges with the bias for loss aversion by the information of the nudge ID2. In this way, recommendation information is identified by the nudge ID1 and the nudge ID2.

As described in Example 3 (user ID=003) in FIG. 6, the nudge ID1=0 and the nudge ID2=0 are set as initial values for a user newly registered in the application 101. As will be described later, when a nudge group to which the user belongs is determined and a target nudge is determined by a nudge determining unit 15, the values of the nudge ID1 and the nudge ID2 for uniquely identifying the target nudge are defined as recommendation information at the time of starting of recommendation. When the section switching process is performed, the recommendation information is changed by changing the values of the nudge ID1 and the nudge ID2 in the user nudge definition table 200a (details of which will be described later).

The user nudge storage unit 200 may store information of a plurality of types of nudges. The user nudge storage unit 200 may store, for example, intervention conditions, details of a behavior to be promoted, a behavioral modification effect, and an incentive as information for correlation with the nudge ID1 and the nudge ID2 in correlation with each other. The intervention conditions are information indicating in what case a nudge can be a candidate for an intervening nudge and is defined, for example, as "case in which a bus scheduled to get on is crowded." The details of a behavior to be promoted are specific details of a behavior to be promoted to a user by a nudge and are defined, for example, as "gets on an uncrowded next bus." The behavioral modification effect is information indicating an extent (a probability) that a user will adopt a behavior promoted by a nudge when nudge intervention is performed and is defined, for example, as "10%." The incentive is an incentive that is given to a user when the user adopts the behavior promoted by the nudge and is defined, for example, as "points 10 p." Since such information is stored, recommendation of a nudge using the application 101 of each user is performed based on the nudge ID1 and the nudge ID2 defined in the user nudge definition table 200a.

Referring back to FIG. 5, the nudge management device 10 is a device associated with verification of an effect of abrasion due to a plurality of times of recommendation of a nudge which is a mechanism for prompting a user to voluntarily adopt a desirable behavior and verification of an effect of recovery due to the elapse of a period after the abrasion has proceeded. The nudge management device 10 is a device that performs the process of distributing new users to nudge groups and the section switching process. The nudge management device 10 includes a verification group storage unit 11, a user information storage unit 12, a distribution destination managing unit 13, a distribution proportion determining unit 14, a nudge determining unit 15, a nudge changing unit 16, and an update unit 17.

The verification group storage unit 11 is a database that stores a verification group management table 11a in which a plurality of verification groups each including a plurality of nudge groups with different target nudges is defined. FIG. 7 is a diagram illustrating an example of the verification group management table 11a. As illustrated in FIG. 7, in the verification group management table 11a, for example, a verification group ID for uniquely identifying a verification group, a nudge group ID for uniquely identifying a nudge group, a first-section nudge ID1 and a first-section nudge ID2, a second-section nudge ID1 and a second-section nudge ID2, a third-section nudge ID1 and a third-section nudge ID2, . . . , and an N-th-section nudge ID1 and an N-th-section nudge ID2 are defined in correlation with each other. The nudge ID1 is information for uniquely identifying a psychological bias associated with a nudge to be recommended. The nudge ID2 is information for uniquely identifying a type of the nudge to be recommended. In this way, recommendation information is identified by the nudge ID1 and the nudge ID2. In the example illustrated in FIG. 7, two nudge groups with a nudge group ID of A and a nudge group ID of B belonging to the same verification group ID are described. A nudge ID to be recommended in each of the first to third sections is defined for each nudge group.

The user information storage unit 12 is a database that stores a user management table 12a in which information for identifying a verification group and a nudge group to which each of a plurality of users belongs is defined. FIG. 8 is a diagram illustrating an example of the user management table 12a. As illustrated in FIG. 8, in the user management table 12a, for example, a user ID, a nudge group ID, a first-section nudge ID1 and a first-section nudge ID2, a second-section nudge ID1 and a second-section nudge ID2, a third-section nudge ID1 and a third-section nudge ID2, . . . , an N-th-section nudge ID1 and an N-th-section nudge ID2, a demonstration start date, a first-section cumulative push notification frequency, a first-section cumulative nudge intervention frequency, a first-section cumulative behavioral modification frequency are defined in correlation with each other. The demonstration start date is a date in which intervention of a nudge has been first performed. The first-section cumulative behavioral modification frequency is a cumulative push notification frequency of a first-section nudge to a user in the first section. The first-section cumulative nudge intervention frequency is a cumulative nudge intervention frequency of the first-section nudge for the user in the first section. The first-section cumulative behavioral modification frequency is a cumulative behavioral modification frequency in which the user has adopted the first-section nudge in the first section. In FIG. 8, only the cumulative push notification frequency, the cumulative nudge intervention frequency, and the cumulative behavioral modification frequency of the first section are defined, but, for example, when there are the first to third sections, the cumulative push notification frequency, the cumulative nudge intervention frequency, and the cumulative behavioral modification frequency are defined actually for each of the first to third sections. The user ID, the nudge group ID, the first-section nudge ID1 and the first-section nudge ID2, the second-section nudge ID1 and the second-section nudge ID2, the third-section nudge ID1 and the third-section nudge ID2, . . . , and the N-th-section nudge ID1 and the N-th-section nudge ID2 in FIG. 8 are information which is determined and registered by the nudge determining unit 15 at the time of registration of a new user and information which is not basically changed. The other information (the demonstration start date, the cumulative push notification frequency, the cumulative nudge intervention frequency, and the cumulative behavioral modification frequency) the in FIG. 8 are information that is updated by the update unit 17 according to a result of recommendation for users.

The distribution destination managing unit 13 identifies a verification group which is a distribution destination (hereinafter also referred to as a current verification group) to which a new user is registered at the time of registration of the new user out of a plurality of verification groups. FIG. 9 is a diagram illustrating an example of a user registration management table 13a. The distribution destination managing unit 13 stores the user registration management table 13a illustrated in FIG. 9 and identifies the current verification group based on the user registration management table 13a. As illustrated in FIG. 9, in the user registration management table 13a, a current verification group ID, the target number of samples of each nudge group, and ON/OFF of an automatic group ID switching mode are defined in correlation with each other. The current verification group ID is information for uniquely identifying a verification group which is a distribution destination. The number of target sample of each nudge group is the target number of samples (a target value) of each nudge group included in the verification group indicated by the current verification group ID. The automatic group ID switching mode is information for defining whether to automatically switch (on or off) the current verification group ID when conditions are satisfied.

The distribution destination managing unit 13 determines whether the numbers of users belonging to a plurality of nudge groups included in the current verification group have reached the target value. That is, the distribution destination managing unit 13 identifies nudge group IDs of the current verification group and nudge IDs correlated with the nudge group IDs from the verification group management table 11a. For example, in the example illustrated in FIG. 10, the nudge group IDs A, B, and P correlated with the current verification group ID 1 in the verification group management table 11a are identified. Then, the distribution destination managing unit 13 extracts user IDs of users correlated with the identified nudge group IDs in the user management table 12a and determines whether the number of users has reached the target value. Here, the target value is the target number of samples defined in the user registration management table 13a. The target number of samples may be manually changed by a system operator.

The distribution destination managing unit 13 performs a process of changing the current verification group when the number of users has reached the target value. The changing process is a process of transmitting a change promotion mail for prompting a system operator to manually change the verification group or the like when the automatic group ID switching mode is in an OFF state. The changing process is a process of automatically changing the current verification group ID defined in the verification group management table 11a when the automatic group ID switching mode is in an ON state.

Figure 10:
FIG. 10 is a diagram illustrating identification of a distribution destination.

The distribution proportion determining unit 14 derives the number of users in which a target nudge has intervened one time or more (the number of active users) for each nudge group of the current verification group and determines a distribution proportion to each nudge group according to the number of active users. For example, when a new user is registered, the distribution proportion determining unit 14 first identifies the current verification group from the user registration management table 13a of the distribution destination managing unit 13 (see FIG. 9). Then, the distribution proportion determining unit 14 identifies the nudge group IDs of the current verification group and the nudge IDs correlated with the nudge group IDs from the verification group management table 11a. Then, the distribution proportion determining unit 14 extracts a user ID of an active user who is correlated with the identified nudge group ID and in whom the first-section cumulative nudge intervention frequency is 1 or more in the user management table 12a (see FIG. 8). The distribution proportion determining unit 14 determines a distribution proportion to each nudge group based on the number of active users in the nudge group. For example, it is assumed that the numbers of active users (the numbers of samples) for the nudge group IDs A, B, and P in FIG. 10 are 11, 12, and 5. In this case, the distribution proportions to the nudge group IDs A, B, and P are 1/11, 1/12, and 1/5.

The nudge determining unit 15 determines a nudge group to which a new user belongs based on the distribution proportions at the time of registration of the new user. For example, when the distribution proportions to the nudge group IDs A, B, and P determined by the distribution proportion determining unit 14 are 1/11, 1/12, and 1/5, the nudge determining unit 15 determines a nudge group to which the new user belongs based on the distribution proportions (determines the destination nudge group with probabilities thereof).

The update unit 17 updates the user management table 12a (see FIG. 8) in association with the new user based on the information determined by the nudge determining unit 15. Specifically, the update unit 17 registers the user ID of the new user in the user management table 12a and registers the nudge group ID and the nudge ID of the sections therein determined by the nudge determining unit 15. The update unit 17 registers information of the user ID of the new user and the nudge ID1 and the nudge ID2 of the first section in the user nudge definition table 200a (see FIG. 6).

The nudge changing unit 16 changes recommendation information in the user nudge definition table from a target nudge to information different from the target nudge at a timing at which a predetermined period (for example, 14 days) in which a plurality of times of recommendation is possible has elapsed from the starting of recommendation. That is, the nudge changing unit 16 rewrites the recommendation information in the user nudge definition table 200a with information of the second-section nudge ID1 and the second-section ID2 in the user management table 12a at a timing at which a plurality of times of recommendation of the target nudge (the first-section nudge) is assumed to be completed as illustrated in FIGS. 11(a) and 11(b).

The nudge changing unit 16 changes the recommendation information in the user nudge definition table to the target nudge again at a timing at which a predetermined period (for example, 14 days) in which a plurality of times of recommendation is possible has elapsed from the changing. That is, the nudge changing unit 16 rewrites the recommendation information in the user nudge definition table 200a with the information of the target nudge (the first-section nudge) again at a timing at which a plurality of times of recommendation of the second-section nudge is assumed to be completed. The nudge changing unit 16 may change the target nudge to a nudge of a next section at a timing at which a predetermined period has elapsed in this way and may not perform the changing (switching) when a nudge of the next section is not registered.

The update unit 17 acquires the result of recommendation of the target nudge to the user and updates the user management table 12a such that the result of recommendation of the target nudge is newly defined in the user management table 12a (see FIG. 8). Specifically, the update unit 17 updates the cumulative push notification frequency, the cumulative nudge intervention frequency, and the cumulative behavioral modification frequency in the user management table 12a (see FIG. 8) in at least a section in which the target nudge has been recommended.

Figure 12:
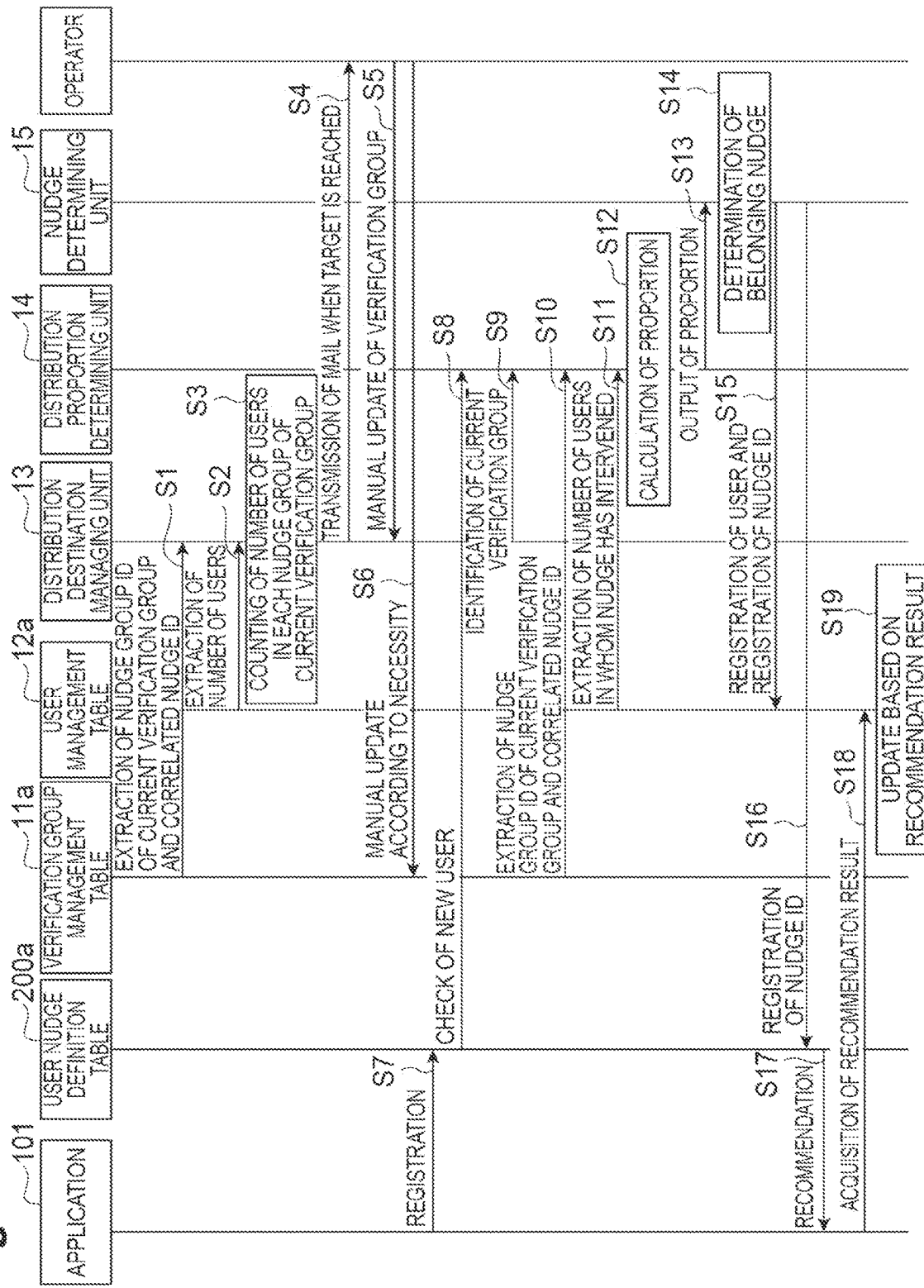
FIG. 12 is a sequence diagram illustrating a new user distributing process.

The process of distributing a new user will be described below with reference to FIG. 12. FIG. 12 is a sequence diagram illustrating the process of distributing a new user.

As illustrated in FIG. 12, first, the distribution destination managing unit 13 extracts nudge group IDs of the current verification group and nudge IDs correlated with the nudge group IDs from the verification group management table 11a (Step S1). Then, the distribution destination managing unit 13 extracts user IDs of users correlated with the identified nudge group IDs in the user management table 12a (Step S2).

Then, the numbers of users in the nudge groups of the current verification group are counted (Step S3), and it is determined whether the numbers of users have reached the target value. When the numbers of users have reached the target value, the distribution destination managing unit 13 transmits a change promotion mail for prompting a system operator to manually change the verification group to the system operator (Step S4). In this case, for example, the system operator may manually update the verification group (Step S5). The system operator may manually update the verification group management table 11a according to necessity (Step S6).

When registration of a new user in the application 101 is performed in a state in which the current verification group has been confirmed in this way (Step S7), first, information of the new user is registered in the user nudge definition table 200a. Then, a new user ascertainment request is transmitted to the distribution proportion determining unit 14 (Step S8), and the distribution proportion determining unit 14 identifies the current verification group (Step S9) and extracts nudge group IDs of the current verification group and nudge IDs correlated with the nudge group IDs from the verification group management table 11a (Step S10).

Then, the distribution proportion determining unit 14 extracts the number of users in which the target nudge has intervened one time or more (the number of active users) for each nudge group of the current verification group (Step S11). Then, the distribution proportion determining unit 14 calculates the distribution proportions to the nudge groups according to the number of active users for each nudge group (Step S12). The distribution proportion determining unit 14 outputs the calculated distribution proportions to the nudge determining unit 15 (Step S13).

Subsequently, the nudge determining unit 15 determines a nudge group to which the new user belongs based on the distribution proportions (Step S14). In this case, the update unit 17 registers the user ID of the new user in the user management table 12a and registers the nudge group ID and the nudge IDs of the sections therein determined by the nudge determining unit 15 (Step S15). The update unit 17 registers information of the user ID of the new user and the nudge ID1 and the nudge ID2 of the first section in the user nudge definition table 200a (see FIG. 6) (Step S15).

When the information of the nudge ID1 and the nudge ID2 of the first section is registered as recommendation information in the user nudge definition table 200a, recommendation of the target nudge using the application 101 is started (Step S17). Then, a result of recommendation is acquired (Step S18) and the user management table 12a is updated based on the acquired information (Step S19).

Figure 13:
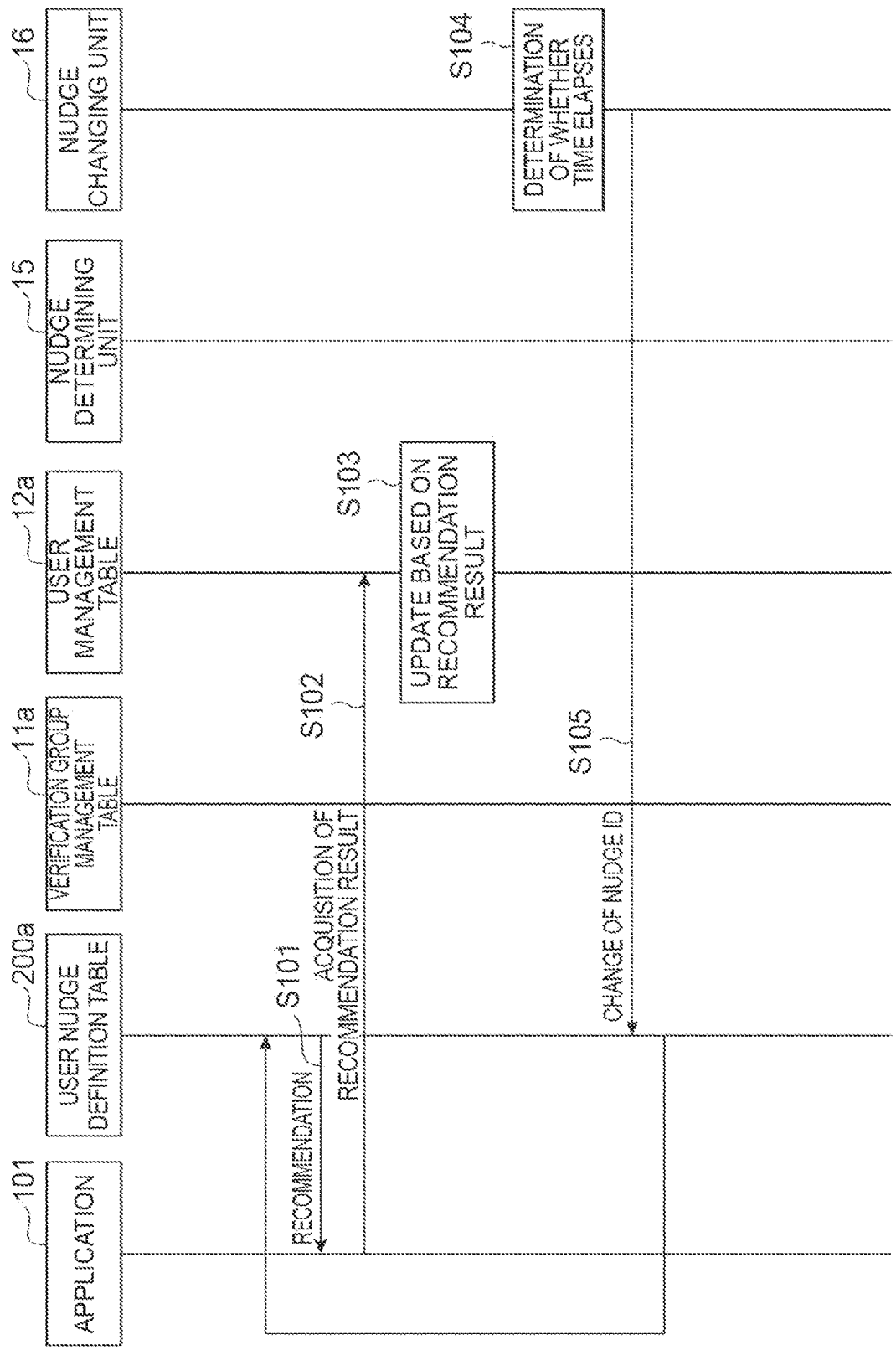
FIG. 13 is a sequence diagram illustrating a process of changing (switching) a target nudge.

A process of changing (switching) a target nudge will be described below with reference to FIG. 13. FIG. 13 is a sequence diagram illustrating the process of changing (switching) a target nudge. As illustrated in FIG. 13, when information of the target nudge of the first section is registered as recommendation information, recommendation of the target nudge using the application 101 is started (Step S101), a result of recommendation is acquired (Step S102), and the user management table 12a is updated based on the acquired information (Step S103). Then, the nudge changing unit 16 determines whether a predetermined period (for example, 14 days) in which a plurality of times of recommendation is possible has elapsed (Step S104). When the predetermined period has not elapsed, changing of a nudge is not performed. On the other hand, when the predetermined period has elapsed, the nudge changing unit 16 changes the recommendation information in the user nudge definition table 200a to information of the nudge ID1 and the nudge ID2 of the second section which is information other than the target nudge (Step S105). After the recommendation information has been changed, recommendation of new recommendation information is performed again.

Operations and advantages of the nudge recommendation system 1 according to the embodiment will be described below.

The nudge recommendation system 1 is an information processing device that performs verification of an effect of abrasion due to a plurality of times of recommendation of a nudge which is a mechanism for prompting a user to voluntarily adopt a desirable behavior and verification of an effect of recovery due to the elapse of a period after the nudge has been abraded, and the information processing device includes: the verification group storage unit 11 configured to store a verification group management table 11a in which a plurality of verification groups each including a plurality of nudge groups with different target nudges is defined; the user information storage unit 12 configured to store a user management table 12a in which information for identifying the verification group and the nudge group to which a user belongs is defined for each of a plurality of users; the user nudge storage unit 200 configured to store a user nudge definition table 200a in which recommendation information which is information to be recommended to each of the plurality of users is defined and the target nudge is defined as a recommendation-start value of the recommendation information; the nudge changing unit 16 configured to perform changing the recommendation information in the user nudge definition table 200a to information different from that of the target nudge at a timing at which a predetermined period in which a plurality of times of recommendation is possible elapses after recommendation has started and changing the recommendation information in the user nudge definition table 200a to the target nudge at a timing at which a predetermined period in which a plurality of times of recommendation is possible elapses after the changing has been performed; and the update unit 17 configured to acquire a result of recommendation of the target nudge to each user and to update the user management table 12a such that the result of recommendation of the target nudge is newly defined in the user management table 12a.

The nudge recommendation system 1 according to the embodiment is an information processing device that performs verification of effects of abrasion and recovery of a nudge. In the nudge recommendation system 1, a plurality of verification groups each including a plurality of nudge groups is defined, and a verification group and a nudge group to which each of a plurality of users belongs are defined. For each of the plurality of users, a target nudge (different target nudges for the nudge groups to which users belong) is defined as a value of recommendation information at the time of starting of recommendation, the recommendation information is changed to information different from the target nudge when a predetermined period in which a plurality of times of recommendation is possible elapses, and the recommendation information is changed again to the target nudge when a predetermined period in which a plurality of times of recommendation is possible additionally elapses. Here, it is thought that a target nudge is gradually abraded when a plurality of times of recommendation is performed in a state in which the target nudge is defined as the value at the time of starting of recommendation. By acquiring a recommendation result of the target nudge which is gradually abraded and defining the recommendation result in the user management table 12a, it is possible to appropriately acquire information suitable for verification of abrasion of the target nudge. It is thought that an effect of a target nudge which has been once abraded is recovered when other information is recommended a plurality of times in a predetermined period after the target nudge has been abraded. By recommending the target nudge again thereafter, acquiring the recommendation result, and defining the recommendation result in the user management table 12a, it is possible to appropriately acquire information suitable for verification of recovery of the target nudge. With this configuration, it is possible to appropriately acquire information suitable for verification of effects of abrasion and recovery of nudges and to contribute to appropriate verification of effects of abrasion and recovery of nudges.

The nudge recommendation system 1 further includes the distribution destination managing unit 13 configured to identify a verification group as a distribution destination to which a new user is distributed at the time of registration of the new user out of the plurality of verification groups, to determine whether the number of users belonging to the plurality of nudge groups included in the verification group which is the distribution destination has reached a target value, and to perform a process of changing the verification group which is the distribution destination when the number of users has reached the target value. With this configuration, when the number of users associated with verification reaches the target value, the verification group in which a new user is registered is switched. Accordingly, it is possible to curb biasing of the numbers of users included in the verification groups. As a result, it is possible to thoroughly acquire information suitable for verification of effects of abrasion and recovery of various target nudges.

The nudge recommendation system 1 further includes: the distribution proportion determining unit 14 configured to derive the number of users in which the target nudge has intervened one time or more in the nudge groups of the verification group which is the distribution destination and to determine a distribution proportion to each of the nudge groups according to the number of users; and the nudge determining unit 15 configured to determine the nudge group to which a new user belongs based on the distribution proportion at the time of registration of the new user. The update unit 17 updates the user management table 12a in association with the new user based on information determined by the nudge determining unit 15. In this way, by determining the distribution proportions to the nudge groups based on the number of users in whom the target nudge has intervened one time or more (the number of active users), determining the nudge group to which the new user belongs based on the distribution proportions, and updating the user management table 12a in association with the new user, it is possible to curb biasing of the numbers of active user for the nudge groups in the same verification group. Accordingly, it is possible to thoroughly acquire information suitable for verification of effects of abrasion and recovery of various target nudges.

Figure 14:
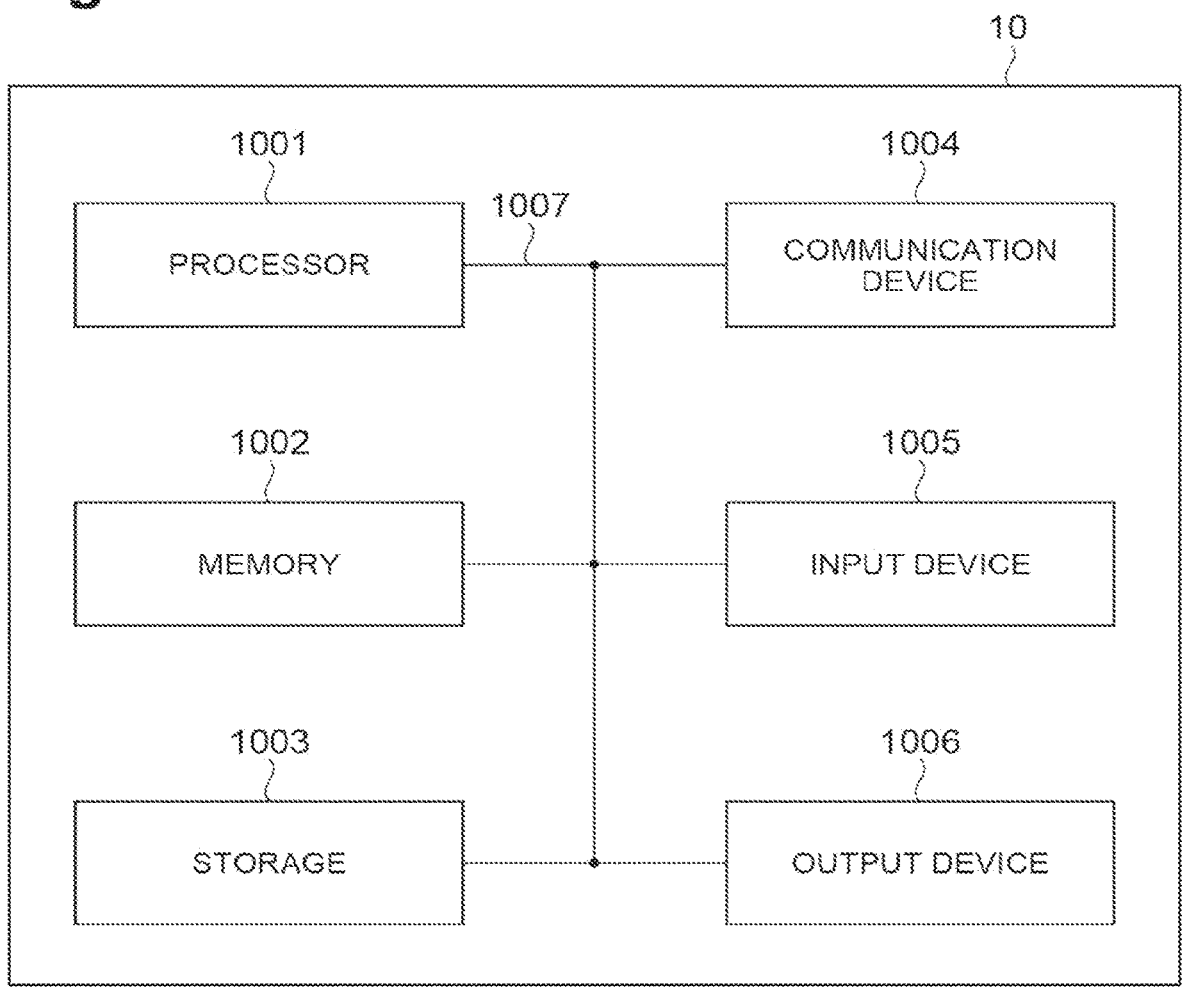
FIG. 14 is a diagram illustrating a hardware configuration of the nudge management device according to the embodiment.

A hardware configuration of the nudge management device 10 will be described below with reference to FIG. 14. The nudge management device 10 may be physically configured as a computer device including a processor 1001, a memory 1002, a storage 1003, a communication device 1004, an input device 1005, an output device 1006, and a bus 1007.

In the following description, the term "device" can be replaced with circuit, device, unit, or the like. The hardware configuration of the nudge management device 10 may be configured to include one or more devices illustrated in the drawing or may be configured to exclude some devices thereof.

The functions of the nudge management device 10 can be realized by reading predetermined software (program) to hardware such as the processor 1001 and the memory 1002 and causing the processor 1001 to execute arithmetic operations and to control communication using the communication device 1004 or to control at least one of reading and writing of data with respect to the memory 1002 and the storage 1003.

The processor 1001 controls a computer as a whole, for example, by causing an operating system to operate. The processor 1001 may be configured as a central processing unit (CPU) including an interface with peripherals, a controller, an arithmetic operation unit, and a register. For example, the control functions such as the nudge changing unit 16 may be realized by the processor 1001.

The processor 1001 reads a program (a program code), a software module, data, or the like from at least one of the storage 1003 and the communication device 1004 to the memory 1002 and performs various processes in accordance therewith. As the program, a program that causes a computer to perform at least some of the operations described in the above-mentioned embodiment is used.

For example, the control functions such as the nudge changing unit 16 may be realized by a control program which is stored in the memory 1002 and which operates in the processor 1001, and the other functional blocks may be realized in the same way. The various processes described above are described as being performed by a single processor 1001, but they may be simultaneously or sequentially performed by two or more processors 1001. The processor 1001 may be mounted as one or more chips. The program may be transmitted from a network via an electrical telecommunication line.

The memory 1002 is a computer-readable recording medium and may be constituted by, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store a program (a program code), a software module, and the like that can be executed to perform a radio communication method according to an embodiment of the present disclosure.

The storage 1003 is a computer-readable storage medium and may be constituted by, for example, at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be referred to as an auxiliary storage device. The storage media may be, for example, a database, a server, or another appropriate medium including the memory 1002 and/or the storage 1003.

The communication device 1004 is hardware (a transmitting and receiving device) that performs communication between computers via at least one of a wired network and a wireless network and is also referred to as, for example, a network device, a network controller, a network card, or a communication module.

The input device 1005 is an input device that receives an input from the outside (for example, a keyboard, a mouse, a microphone, a switch, a button, or a sensor). The output device 1006 is an output device that performs an output to the outside (for example, a display, a speaker, or an LED lamp). The input device 1005 and the output device 1006 may be configured as a unified body (for example, a touch panel).

The devices such as the processor 1001 and the memory 1002 are connected to each other via the bus 1007 for transmission of information. The bus 1007 may be constituted by a single bus or may be constituted by buses which are different depending on the devices.

The nudge management device 10 may be configured to include hardware such as a microprocessor, a digital signal processor (DSP), an application-specific integrated circuit (ASIC), a programmable logic device (PLD), or a field-programmable gate array (FPGA), and some or all of the functional blocks may be realized by the hardware. For example, the processor 1001 may be mounted using at least one piece of the hardware.

While the present disclosure has been described above in detail, it will be apparent to those skilled in the art that the present disclosure is not limited to the embodiments described in the present disclosure. The present disclosure can be altered and modified in various forms without departing from the gist and scope of the present disclosure defined by description in the appended claims. Accordingly, the description in the present disclosure is for exemplary explanation and does not have any restrictive meaning for the present disclosure.

The aspects/embodiments described in the present disclosure may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IFFE 802.11 (Wi-Fi), IEEE 802.16 (WiMAX)), IEEE 802.20, UWB (Ultra-Wide Band), Bluetooth (registered trademark), or another appropriate system and/or a next-generation system which is extended based thereon.

The order of processing steps, the sequences, the flow-charts, and the like of the aspects/embodiments described above in the present disclosure may be changed unless conflictions arise. For example, in the methods described in the present disclosure, various steps are described as elements in the exemplary order, and the methods are not limited to the described specific order.

Information or the like which is input or output may be stored in a specific place (for example, a memory) or may be managed using a management table. Information or the like which is input or output may be overwritten, updated, or added. Information or the like which is output may be deleted. Information or the like which is input may be transmitted to another device.

Determination may be performed using a value (0 or 1) which is expressed in one bit, may be performed using a Boolean value (true or false), or may be performed by comparison between numerical values (for example, comparison with a predetermined value).

The aspects/embodiments described in the present disclosure may be used alone, may be used in combination, or may be switched during implementation thereof. Notifying of predetermined information (for example, notifying that "it is X") is not limited to explicit notification, and may be performed by implicit notification (for example, notifying of the predetermined information is not performed).

Regardless of whether it is called software, firmware, middleware, microcode, hardware description language, or another name, software can be widely construed to refer to a command, a command set, a code, a code segment, a program code, a program, a sub program, a software module, an application, a software application, a software package, a routine, a sub routine, an object, an executable file, an execution thread, a sequence, a function, or the like.

Software, commands, and the like may be transmitted and received via a transmission medium. For example, when software is transmitted from a website, a server, or another remote source using at least one of wired technology such as a coaxial cable, an optical fiber cable, a twisted-pair wire, or a digital subscriber line (DSL) and wireless technology such as infrared rays, radio waves, or microwaves, the wired technology and/or the wireless technology is included in definition of the transmission medium.

Information, signals, and the like described in the present disclosure may be expressed using one of various different techniques. For example, data, instructions, commands, information, signals, bits, symbols, and chips which can be mentioned in the overall description may be expressed by a voltage, a current, electromagnetic waves, a magnetic field or magnetic particles, a photo field or photons, or an arbitrary combination thereof.

Terms described in the present disclosure and terms required for understanding the present disclosure may be substituted with terms having the same or similar meanings.

Information, parameters, and the like described above in the present disclosure may be expressed using absolute values, may be expressed using values relative to predetermined values, or may be expressed using other corresponding information.

A communication terminal may also be referred to as a mobile communication terminal, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other appropriate terms by those skilled in the art.

The expression "based on" used in the present disclosure does not mean "based on only" unless otherwise described. In other words, the expression "based on" means both "based on only" and "based on at least."

No reference to elements named with "first," "second," or the like used in the present disclosure generally limit amounts or order of the elements. These naming can be used in the present disclosure as a convenient method for distinguishing two or more elements. Accordingly, reference to first and second elements does not mean that only two elements are employed or that a first element precedes a second element in any form.

When the terms "include" and "including" and modifications thereof are used in the present disclosure, the terms are intended to have a comprehensive meaning similarly to the term "comprising." The term "or" used in the present disclosure is not intended to mean an exclusive logical sum.

In the present disclosure, two or more of any devices may be included unless the context or technical constraints dictate that only one device is included.

In the entire present disclosure, singular terms include plural referents unless the context or technical constraints dictate that a unit is singular.

REFERENCE SIGNS LIST

1 . . . Nudge recommendation system (information processing device), 11 . . . Verification group storage unit, 11a . . . Verification group management table, 12 . . . User information storage unit, 12a . . . User management table, 13 . . . Distribution destination managing unit, 14 . . . Distribution proportion determining unit, 15 . . . Nudge determining unit, 16 . . . Nudge changing unit, 17 . . . Update unit, 200 . . . User nudge storage unit, 200a . . . User nudge definition table

The invention claimed is:

1. An information processing device that performs verification of an effect of abrasion due to a plurality of times of recommendation of a nudge which is a mechanism for prompting a user to voluntarily adopt a desirable behavior and verification of an effect of recovery due to the elapse of a period after the nudge has been abraded, the information processing device comprising:
- a verification group storage unit configured to store a verification group management table in which a plurality of verification groups each including a plurality of nudge groups with different target nudges is defined;
- a user information storage unit configured to store a user management table in which information for identifying the verification group and the nudge group to which a user belongs is defined for each of a plurality of users;
- a user nudge storage unit configured to store a user nudge definition table in which recommendation information which is information to be recommended to each of the plurality of users is defined and the target nudge is defined as a recommendation-start value of the recommendation information;
- a nudge changing unit configured to perform changing the recommendation information in the user nudge definition table to information different from that of the target nudge at a timing at which a predetermined period in which a plurality of times of recommendation is possible elapses after recommendation has started and changing the recommendation information in the user nudge definition table to the target nudge at a timing at which a predetermined period in which a plurality of times of recommendation is possible elapses after the changing has been performed; and
- an update unit configured to acquire a result of recommendation of the target nudge to each user and to update the user management table, wherein the update of the user management table newly defines the result of recommendation of the target nudge in the user management table.

2. The information processing device according to claim 1, further comprising a distribution destination managing unit configured to identify a verification group as a distribution destination to which a new user is distributed at the time of registration of the new user out of the plurality of verification groups, to determine whether the number of users belonging to the plurality of nudge groups included in the verification group which is the distribution destination has reached a target value, and to perform a process of changing the verification group which is the distribution destination when the number of users has reached the target value.

3. The information processing device according to claim 2, further comprising:
- a distribution proportion determining unit configured to derive the number of users in which the target nudge has intervened one time or more in the nudge groups of the verification group which is the distribution destination and to determine a distribution proportion to each of the nudge groups according to the number of users; and
- a nudge determining unit configured to determine the nudge group to which a new user belongs based on the distribution proportion at the time of registration of the new user,
wherein the update unit updates the user management table in association with the new user based on information determined by the nudge determining unit.

* * * * *